Dec. 12, 1939. J. A. J. BENNETT 2,183,158
ROTATIVE SUSTAINING WING FOR AIRCRAFT
Filed June 16, 1936
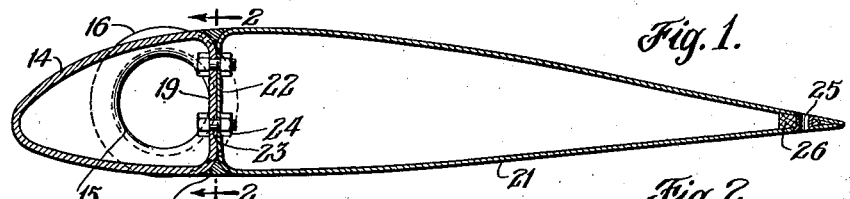
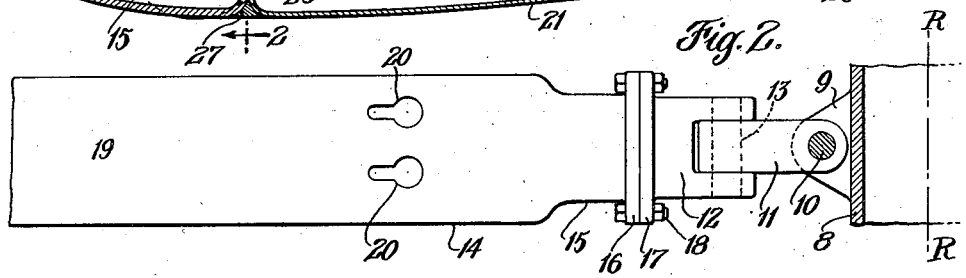
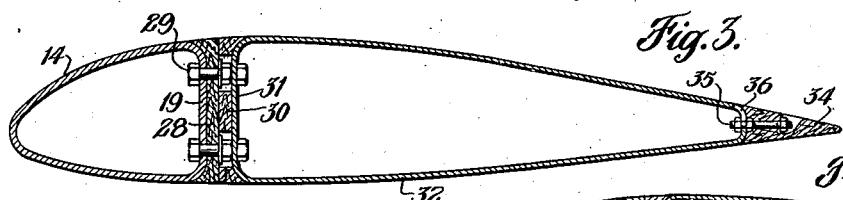
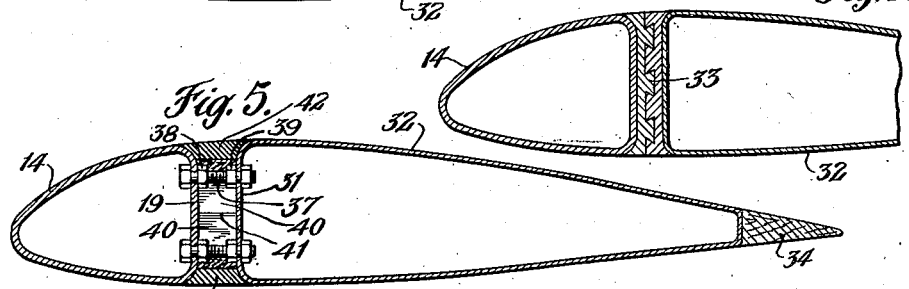
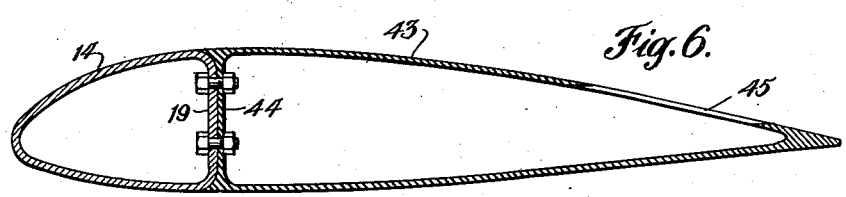
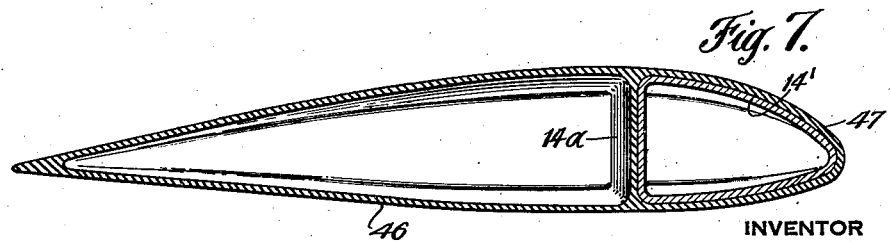
INVENTOR
James Allan Jamieson Bennett
BY
Synnestvedt + Lechner
ATTORNEYS Patented Dec. 12, 1939

2,183,158

UNITED STATES PATENT OFFICE 2,183,158

ROTATIVE SUSTAINING WING FOR AIRCRAFT

James Allan Jamieson Bennett, Genista, Newton Mearns, Renfrew, Scotland, assignor, by mesne assignments, to Autogiro Company of America, a corporation of Delaware Application June 16, 1936, Serial No. 85,509
In Great Britain June 21, 1935

16 Claims. (Cl. 244—123)

This invention relates to rotative sustaining wings or blades for aircraft, and is particularly concerned with such blades or wings for use in an "articulated" sustaining rotor, i. e., a rotor in which the blades have freedom for swinging movements in a plane containing the rotational axis as well as in a direction generally fore and aft in their rotative path of travel.

The invention, moreover, is involved in improvements in blade structure, it being a major object of the invention to make possible extremely simple manufacture of such blades and further to combine this advantage with a number of other advantages hereinafter mentioned.

It is an important object of the invention to provide a rotor blade or wing having an improved and economical weight distribution and also having great rigidity in torsion.

The structure of the present invention is further calculated to provide a blade having its sectional mass center located relatively close to the leading edge thereof. In this connection, it may be noted that certain prior types of rotative wings have employed nonstructural masses, generally placed near the leading edge of the wing, for the purpose of advancing the sectional center of gravity toward the leading edge. The structure of the present invention provides for the desired forward location of the center of gravity by novel distribution of the weight of the structural elements of the blade itself, thus eliminating the necessity for employing non-structural masses.

By virtue of the foregoing, it is possible to reduce the total weight of the wing, as compared with prior practice. The foregoing advantages relating to mass distribution, etc., are all accomplished in a wing which is outstanding in its simplicity and economy of manufacture.

How the foregoing together with other objects and advantages are attained will appear more fully from the following description, making reference to the accompanying drawing illustrating several different embodiments of rotative sustaining wings for accomplishing the purposes in view.

Figure 1 is a sectional view of a wing incorporating features of improvement contemplated by this invention, the view being taken looking toward the root end of the wing;

Figure 2 is a side elevation of a part of the wing shown in Figure 1, taken on the line 2—2 of Figure 1, the view also including a fragmentary showing of certain blade mounting and hub parts;

Figure 3 is a view similar to Figure 1 showing a modified construction;

Figure 4 illustrates, in section, a wing of the general type shown in Figure 3 but incorporating a detailed modification; and Figures 5, 6 and 7 are views of three additionally modified wing structures, Figure 7 being taken in a direction toward the outer end of the wing.

In Figure 2 the line R—R indicates the rotational axis of the hub 8 on which the blades of a sustaining rotor are mounted. The hub may be provided with pairs of apertured lugs 9, equal in number to the number of blades incorporated in the rotor, these lugs serving to cooperate with a "flapping" pivot 10 which joins the extension link 11 with the lugs 9. The link 11, in turn, is connected with a root end fitting 12 of a blade, by means of a "drag" pivot 13. The blades to be described hereinafter are adapted to be secured to the fitting 12.

In the arrangement shown in Figures 1 and 2, the blade incorporates a plurality of tubular members one of which, in effect, serves as a spar member, this one being designated 14. This tubular member may conveniently be of D-section, shaped so as to define the leading edge or nose of the cross-sectional contour of the wing.

At its inner or root end, this member may be swaged to a circular section, indicated at 15, and provided with a flange 16 at the extremity of the inner end for cooperation with an abutting flange 17 formed on the fitting 12, the two flanges being bolted together as at 18 to complete the connection of the blade to the hub. It will be noted that, as shown in Figure 1, the circular end 15 of the tubular spar member is sectionally located in spaced relation from the leading edge of the wing, this for the purpose of bringing the attachment point close to the sectional center of gravity of the blade.

The flatted side 19 of the member 14 is provided with slotted bolt holes 20 (see Fig. 2), for use in attachment of the trailing edge part of the wing which takes the form of a tubular fairing member 21. In accordance with the arrangement shown in Figures 1 and 2, the tubular fairing member may be formed of thin sheet metal, preferably substantially thinner than the leading edge tube. The sheeting from which the fairing tube is formed may be bent to provide a flatted portion 22 abutting against the flatted part 19 of the member 14. The part 22 may also be apertured to pass the bolts 23, the heads of which may be inserted in the slotted bolt holes 20 and during manufacture, I prefer to leave the two rear edges of the sheeting 21 free to provide access into the interior of the fairing tube for the purpose of tightening the nuts 24 threaded on to the bolts 23. This attachment rigidly secures the two parts of the blade together and the action of centrifugal force on the trailing edge part of the wing tends to hold the fastening bolts in the slotted ends of the bolt holes 20 in the tube 14. After the bolts are tightened, the rear edges of the sheeting from which the fairing tube is being formed may be brought together and welded or secured as by means of hollow rivets 25, a suitable V-section spacer 26 having first been inserted so as to ensure proper contour at the trailing edge.

To maintain the contour of the aerofoil section adjacent the junction of the two tubes, any suitable packing material or hardenable plastic filler 27 may be employed to fill the small upper and lower recesses occurring between the two parts of the blade.

In Figure 3 I have illustrated a modified structure in which the fairing tube is somewhat differently constructed and is further secured to the leading edge tube 14 in a different manner. In this arrangement, a spruce or equivalent strip 28 is bolted to the flatted side 19 of the leading edge tube, bolts 29 being provided for this purpose. A second similar strip 30 is bolted in the same manner to the flatted side 31 of the fairing tube 32, the fairing tube, in this embodiment, being formed from solid drawn tubing. After attachment of the spruce strips 28 and 30, these two strips may be brought together to form a butted joint which may be glued. The protruding portions of the nuts 29 may conveniently be fitted into recesses formed in the opposing member. A properly glued joint of this type is ordinarily stronger than the timber members employed, although, if desired, the two members of the joint may take the form shown in Figure 4, i. e., may be dovetailed as shown at 33 to ensure rigid connection of the several parts of the blade. In the arrangements of Figures 3 and 4, the spruce or equivalent joint members may be properly shaped so as to eliminate the necessity of employing filler material of the type shown at 27 in Figure 1.

A spruce trailing edge member 34 may be fastened to the rear edge of the fairing tube 32 as shown in Figure 3, the attachment including bolts 35 the nuts of which may be recessed into the trailing edge element and the heads of which may be engaged in slotted bolt holes similar to those shown at 20 in Figure 2. To facilitate this type of attachment for a trailing edge element, the rear edge of the tube is preferably flatted, as clearly shown in Figure 3, and if the rear face is made of substantial width, the circular part 36 of the slotted bolt holes may be made large enough to admit a tool such as a tube spanner, for the purpose of tightening the joint.

The structure of Figure 5 also incorporates a tubular spar member 14 and a fairing tube 32, the latter of which may be provided with a trailing edge element 34 in a manner similar to the showing of Figure 3.

The attachment of the two tubular members to each other takes a different form in the arrangement of Figure 5. Here the two opposed and Latted surfaces 19 and 31 are both provided with slotted bolt holes and double-headed bolts 37 are engaged in the slotted holes, the bolts being provided with pairs of nuts 38—39 which cooperate with the heads of the bolts in securing the two tubes of the blade together in spaced relation. The spacing between the tubes may be adjusted by varying the length of the bolts employed. The space between the tubes affords access to the nuts 38 and 39, and after tightening the interspace may be filled by means of filler blocks 40, for example of balsa wood, preferably inserted both from above and from below and meeting at a glued joint 41. The recesses adjacent the top and bottom surfaces may then be filled with some suitable plastic composition 42 which is shaped to complete the profile of the wing section.

According to the arrangement of Figure 6, the fairing or trailing edge tube 43 is molded from some suitable composition such as a resinous composition, for instance "Bakelite" or "Tufnol". The fairing tube may be molded to accurately fit the rear portion of the spar tube 14, in view of which no filler material is necessary. The forward flatted side 44 of the fairing tube may be secured to the flatted side 19 of the spar tube by means of bolts in a manner similar to that described in connection with Figure 1. For the purpose of permitting insertion and tightening of the attachment bolts, the fairing tube may be provided with spaced apertures, as shown for example at 45, through which a wrench may be inserted.

A modification of the molded type of fairing tube is shown in Figure 7. Here the fairing tube 46 may be made substantially continuous, i. e., without apertures or breaks, and may be secured to the spar tube 14' by an integral molded shell 47 surrounding the spar tube. The frictional engagement here provided may be made sufficient to connect the parts together. If desired, the cross-sectional shape of the spar tube in this arrangement may be changed toward the tip of the blade. This may be accomplished while maintaining the same peripheral dimension of the tube, for example, by reducing its depth, which will be accompanied by an increase in its width. This may be used not only to provide a smaller thickness with relation to chord toward the tip of the blade but also to provide positive fixation of the molded material to the spar. In such an arrangement, since the spar tube is progressively tapered along its length (see the inclination of the wall at 14a in Fig. 7), under the influence of centrifugal force, a wedging action is set up, resulting in tight frictional engagement of the molded material with the spar tube. Thus, as with other arrangements already described, the action of centrifugal force tends to tighten the connection of the fairing tube to the spar tube.

The arrangement of Figure 7 is of especial advantage since the transverse shape of the spar tube 14' provides suitable torsional fixation for the fairing, without the necessity of perforating the spar and so detracting from its strength.

In an arrangement of the type shown in Figure 7 particularly, the spar tube may obviously take a variety of shapes, although it is preferable to employ one which in part substantially defines a portion of the cross-sectional contour of the wing.

If desired, in the arrangements employing molded material (see Figs. 6 and 7), the trailing edge or fairing tube may be provided with internal longitudinal or lateral corrugations to increase the rigidity. This may conveniently be accomplished by the use of collapsible mandrels for shaping the inside surface of the hollow fairing.

It will be understood that the root end attachment for mounting the blade, as shown in Figures 1 and 2, may be adopted in any of the other forms of blades although modifications in this respect are obviously feasible without departing from the spirit of the invention. For example, the root end fitting may be secured not only to the leading edge tube but also to the trailing edge tube, as by means of straps or the like, or the mounting may take a form along the lines of that disclosed in my co-pending application Serial Number 21,453, filed May 14, 1935, and issued as Patent No. 2,152,861, April 4, 1939.

The completed rotor blade of any of the forms herein illustrated may be entirely covered with doped fabric in the usual manner.

While a greater number of tubular members may be incorporated in a blade built up in accordance with this invention, I prefer the division of the blade section into two parts, as herein shown, for the sake of simplicity and economy of manufacture and also for the reason that this type of construction lends itself readily to the disposition of the joint between the two parts well forwardly and thus location of the mass center of the blade relatively close to the leading edge.

In all forms employing metal for both parts of the wing, I prefer to use a relatively light alloy of aluminum, magnesium, or the like for the fairing tube, which may either be drawn solid or formed from sheet metal. Thus the fairing or trailing edge portion of the wing is of substantially lighter construction than the spar tube, with a further effect toward maintaining the mass center well forwardly in the blade section.

Another advantage of employing a plurality of tubes to make up the blade section, as contemplated by this invention, is that a stiffening web or wall is provided in the blade at a point between its leading and trailing edges. The strength and rigidity is especially great in arrangements of the type shown wherein tubular elements incorporated in the blade are provided with flatted surfaces lying substantially in a plane containing the longitudinal axis of the blade and perpendicular to the chord thereof.

In all forms the spar tube or its equivalent is preferably continuous substantially throughout the length of the blade, although as will readily be understood the fairing tube may be sectionalized, if desired, each section being attached to the spar tube and thus held in proper position as against the action of centrifugal force during rotation of the rotor.

In accordance with the foregoing, the invention provides an unusually simple and inexpensive type of blade which, while being of this simple and inexpensive construction, at the same time incorporates a number of other desirable characteristics.

The invention further makes possible an extremely smooth-surfaced blade, particularly as compared with blades of the spar and rib type of construction.

I claim:

1. A rotative sustaining wing for aircraft in large part consisting of a plurality of elongated tubular members secured together with their major axes in substantial parallelism, the tubular members being shaped to define different portions of the cross-sectional contour of the wing fore and aft thereof, and, in assembled relation, defining the major part of the total cross-sectional contour of the wing, and attachment means for mounting the wing on a cooperating rotating hub, the attachment means being secured to a tubular member at the nose of the wing.

2. A rotative sustaining wing for aircraft in large part consisting of a plurality of elongated tubular members secured together with their major axes in substantial parallelism, the tubular members being shaped to define different portions of the cross-sectional contour of the wing, and, in assembled relation, defining the major part of the total cross-sectional contour of the wing, and attachment means for mounting the wing on a cooperating rotative hub, the attachment means being connected with the tubular members defining the nose of the wing there being another tubular member secured as against dislodgement under the influence of centrifugal force by attachment to said one member, the nose tube being of heavy construction and said other tube being of light construction.

3. A rotative sustaining wing for aircraft in large part consisting of a plurality of elongated tubular members secured together with their major axes in substantial parallelism, the tubular members being shaped to define different portions of the cross-sectional contour of the wing fore and aft thereof, and attachment means for mounting the wing on a co-operating rotative hub, the attachment means being connected with a tubular member toward the leading edge thereof and a tubular member toward the trailing edge part of the wing being secured as against dislodgement under the influence of centrifugal force by attachment to said leading edge member, the leading edge member being substantially heavier per unit of wing area defined thereby than said trailing edge member.

4. A rotative sustaining wing for aircraft in large part consisting of a plurality of elongated tubular members secured together with their major axes in substantial parallelism, the tubular members being shaped to define different portions of the cross-sectional contour of the wing, two of said members being provided with flatted sides presented toward each other, and attachment strips secured to the flatted sides of the two members, said strips being secured to each other.

5. A rotative sustaining wing for aircraft in large part consisting of a plurality of elongated tubular members secured together with their major axes in substantial parallelism, the tubular members being shaped to define different portions of the cross-sectional contour of the wing, two of said members being provided with flatted sides presented toward each other, and attachment strips secured to the flatted sides of the two members, said strips being shaped to provide an interlocking fit with respect to each other.

6. A rotative sustaining wing for aircraft in large part consisting of a plurality of elongated tubular members secured together with their major axes in substantial parallelism, the tubular members being shaped to define different portions of the cross-sectional contour of the wing, attachment means secured to one of said members for mounting the wing on a cooperating rotative hub, two of said members being provided with flatted sides presented toward each other, and means securing another of said members to said one as against dislodgement under the influence of centrifugal force with the flatted sides of the two in spaced relation.

7. A rotative sustaining wing for aircraft, said wing being in large part of tubular construction, a trailing edge element for the wing, and means securing said element to a tubular part of the wing including slotted bolt holes formed in said tubular part and bolts engaging the slotted bolt holes and recessed in the trailing edge element.

8. A rotative sustaining wing for aircraft incorporating a pair of tubular members arranged with their major axes in substantial parallelism and defining the major part of the cross-sectional contour of the wing, one of said members being formed as a closed tube, and an adjacent member being formed of sheet material having substantial inherent rigidity, a mid portion of which is secured to the tubular wall of the first member within the cross-sectional contour of the wing and the edge portions of which are bent together and secured to each other.

9. A rotative sustaining wing for aircraft incorporating a pair of tubular members arranged with their major axes in substantial parallelism and defining the major part of the cross-sectional contour of the wing, one of said members being formed as a closed tube, and an adjacent member being formed of sheet material having substantial inherent rigidity a mid portion of which is secured to the tubular wall of the first member within the cross-sectional contour of the wing and the edge portions of which are bent together and secured to each other to form the trailing edge of the wing.

10. A rotative sustaining wing for aircraft including a tubular member shaped to define a portion of the cross-sectional contour of the wing, and an additional tubular member molded to adjoin the first member and to define an adjacent portion of the cross-sectional contour of the wing.

11. A rotative sustaining wing for aircraft including a tubular member shaped to define a portion of the cross-sectional contour of the wing, an additional tubular member molded to adjoin the first member and to define an adjacent portion of the cross-sectional contour of the wing, and means formed at the inner end of the first member for cooperation with a rotative mounting for the wing, the molded member being mounted on the first member.

12. A rotative sustaining wing for aircraft including a tubular member shaped to define a portion of the cross-sectional contour of the wing, an additional tubular member molded to adjoin the first member and to define an adjacent portion of the cross-sectional contour of the wing, and attachment means located interiorly of the members for securing them together at their adjoining portions, one of said members being apertured for access to the attachment means.

13. A rotative sustaining wing for aircraft in large part consisting of a plurality of elongated tubular members arranged with portions adjacent to each other and with their major axes in substantial parallelism, and attachment means located interiorly of the members for securing them together at their adjacent portions, one of said members being apertured for access to the attachment means.

14. A rotative sustaining wing for aircraft in large part consisting of a plurality of elongated tubular members secured together with their major axes in substantial parallelism, the tubular members being shaped to define different portions of the cross-sectional contour of the wing fore and aft thereof, tubing incorporated in the wing toward the forward edge thereof being of relatively heavy construction as compared with tubing incorporated in the wing toward the trailing edge thereof, and attachment means for mounting the wing on a cooperating rotative hub, the attachment means being connected with a forward tube of heavy construction, and a rearward tube of relatively light construction being secured as against dislodgement under the influence of centrifugal force by attachment to said tube of heavy construction.

15. A rotative sustaining wing for aircraft in large part consisting of a plurality of elongated tubular members arranged with their major axes in substantial parallelism, the tubular members being shaped to define different portions of the cross-sectional contour of the wing fore and aft thereof, attachment means for mounting the wing on a cooperating rotative hub, the attachment means being connected with a tubular member defining the nose of the wing, said nose member of the wing and another tubular member to the rear thereof being provided with opposed flatted faces presented toward each other, and bolts projected through said opposed flatted faces securing the second tubular member to the first as against dislodgement under the influence of centrifugal force of rotation of the wing.

16. A rotative sustaining wing for aircraft comprising two elongated tubular members arranged with their major axes in substantial parallelism, one of said tubular members being shaped to define the nose portion of the wing and the other being shaped to define the trailing edge portion of the wing, said nose member comprising a drawn metal tube of approximately D-section and being of substantially heavier construction per unit of wing area defined thereby than said trailing edge member, whereby to provide a mass center location disposed well forward cross sectionally of the wing, the nose member further having its inner end portion shaped to a circular section and provided with attachment means for mounting the wing, said trailing edge member having a flatted portion presented toward the flatted portion of the nose member, and means cooperating with said flatted portions for securing the trailing edge member to the nose member as against dislodgement under the influence of centrifugal force.

JAMES ALLAN JAMIESON BENNETT.